United States Patent [19]

Bushnell

[11] 4,074,584

[45] Feb. 21, 1978

[54] DOMESTIC FOOD MIXERS

[76] Inventor: David William Bushnell, 15 Fifth Avenue, Denvilles, Havant, Hampshire, England

[21] Appl. No.: 739,306

[22] Filed: Nov. 5, 1976

[51] Int. Cl.² ............................ F16H 1/12; F16H 1/20
[52] U.S. Cl. .................................................. 74/421 A
[58] Field of Search ........................ 74/421 A; 11/660

[56] References Cited

U.S. PATENT DOCUMENTS

| 2,742,797 | 4/1956 | Perham | 74/421 A |
| 3,367,210 | 2/1968 | Scott | 74/421 A X |
| 3,677,100 | 7/1972 | Kajiwara | 74/660 |

Primary Examiner—Leonard H. Gerin
Attorney, Agent, or Firm—Lewis H. Eslinger

[57] ABSTRACT

A domestic food mixer in which a housing is formed as a base portion and a cover portion, each of plastics material, the base portion having a pair of apertures adjacent one end. A bearing plate is secured in the base portion of the housing in overlying relationship to the apertures, and a pair of pinions each have a lower axial shaft extending on the lower side of the pinion and an upper axial shaft extending on the upper side of the pinion. The lower axial shafts of the pinions are located in the apertures and have a shoulder which rests on the bearing plate. An electric motor includes a frame which rests on locating elements on the base portion and the armature shaft of the electric motor carries a drive worm which is engaged between the pinions. A mounting plate which forms part of the electric motor frame has two apertures therein, one engaging each upper axial shaft, the mounting plate engaging on shoulders of the upper axial shaft. Abutments on the cover portion of the housing engage on the electric motor and screws hold the cover and base portions together, whereby the pinions and electric motor are held in place. This structure is extremely simple to assemble, thereby reducing the cost of the mixer.

8 Claims, 5 Drawing Figures

DOMESTIC FOOD MIXERS

The present invention relates to domestic food mixers. In order to reduce the cost of domestic food mixers attempts have been made over the years to reduce the size and complexity of the mixers and small, handheld mixers, which may or may not be provided with a support stand, have found wide acceptance and considerable commercial success. However, even these handheld mixers are sufficiently complex to involve a considerable amount of assembly time so that the cost of assembly constitutes a significant proportion of the total cost of the mixer. It is an object of the present invention to overcome this disadvantage.

It is now proposed, according to the present invention, to provide a domestic food mixer comprising a plastics material housing including a base portion and a cover portion, a pair of apertures formed adjacent one end of the base portion; a bearing plate secured in the base portion of the housing in overlying relation to said apertures; a pair of pinions each having a lower axial shaft extending on the lower side of the pinion and an upper axial shaft extending on the upper side of the pinion, said lower axial shaft being located in one of the apertures and having a shoulder resting on said bearing plate; an electric motor having a frame resting on locating elements on said base portion; an armature shaft on said electric motor carrying a drive worm which is engaged between said pinions; a mounting plate forming part of said electric motor frame, said mounting plate having two apertures therein, one engaging each upper axial shaft, the mounting plate engaging on shoulders of the upper axial shaft; abutment members on the cover portion of the housing engaging said electric motor; and securing means holding the cover and base portions together, whereby said pinions and electric motor are held in place.

With such a construction the assembly is relatively simple. Thus with the base and cover portions of the housing preformed as injection mouldings, the bearing plate can be formed of metal and secured in the base portion and then the only assembly operations which are necessary are the placing of the pinions in the apertures, and the mounting of the motor within the housing so that it engages on its locating elements and holds the pinions in place. The cover portion is then placed on and the securing means, which may for example be three self-tapping screws, are simply tightened up and the whole assembly operation is complete.

Of course it is desirable that further elements may be provided in the domestic food mixer and for this purpose a control switch block may be fitted onto the mounting plate portion of the electric motor frame and, similarly a brush holder plate can be mounted on the electric motor frame and be engaged by the control switch block which can be arranged so that it cannot be removed, once it has been inserted.

Associated with the control switch block there is preferably a rotatable contact element which is mounted on the control switch block prior to its assembly on the mounting plate and the assembler then simply rests an actuator on the contact element and then rests a control element, which has a portion accessible through an opening in a cover portion of the housing, on the actuator and then places the cover portion in position to hold the control element and actuator in place. To simplify the assembly preferably the control element is provided with an outer tapered surface and the cover portion of the housing has a co-operating surface or surfaces which engages this tapered surface.

It is often convenient with mixers of this type to provide an ejector to eject the beaters of the mixer which are pushed up and held resiliently in place within the pinions. For this purpose, the control element preferably has a bore therein, the control element being accessible through a side opening, and the bore having axially aligned therewith an orifice in the top of the cover portion of the housing. Through the orifice and bore can extend an ejector which is spring-urged upwardly, and the ejector may include two ejector fingers, which are advantageously guided by ears formed on the control switch block, these fingers being axially aligned with the bores in the pinions. If this ejector arrangement is included, then advantageously, the control element also rests on the fingers, to hold the ejector in position within the housing. Thus all the components within the housing are held in place by resting on one another and by the two portions of the housing being secured by screwing as indicated above.

Preferably, the actuator and ejector are provided with co-operating means which ensure that the ejector can only be pressed downwardly to eject the beaters and the contact element is moved to the "off" position to prevent the beaters from being accidentally ejected when in operation.

In order that the invention may more readily be understood, the following description is given, merely by way of example, reference being made to the accompanying drawings in which.

Figure 1:
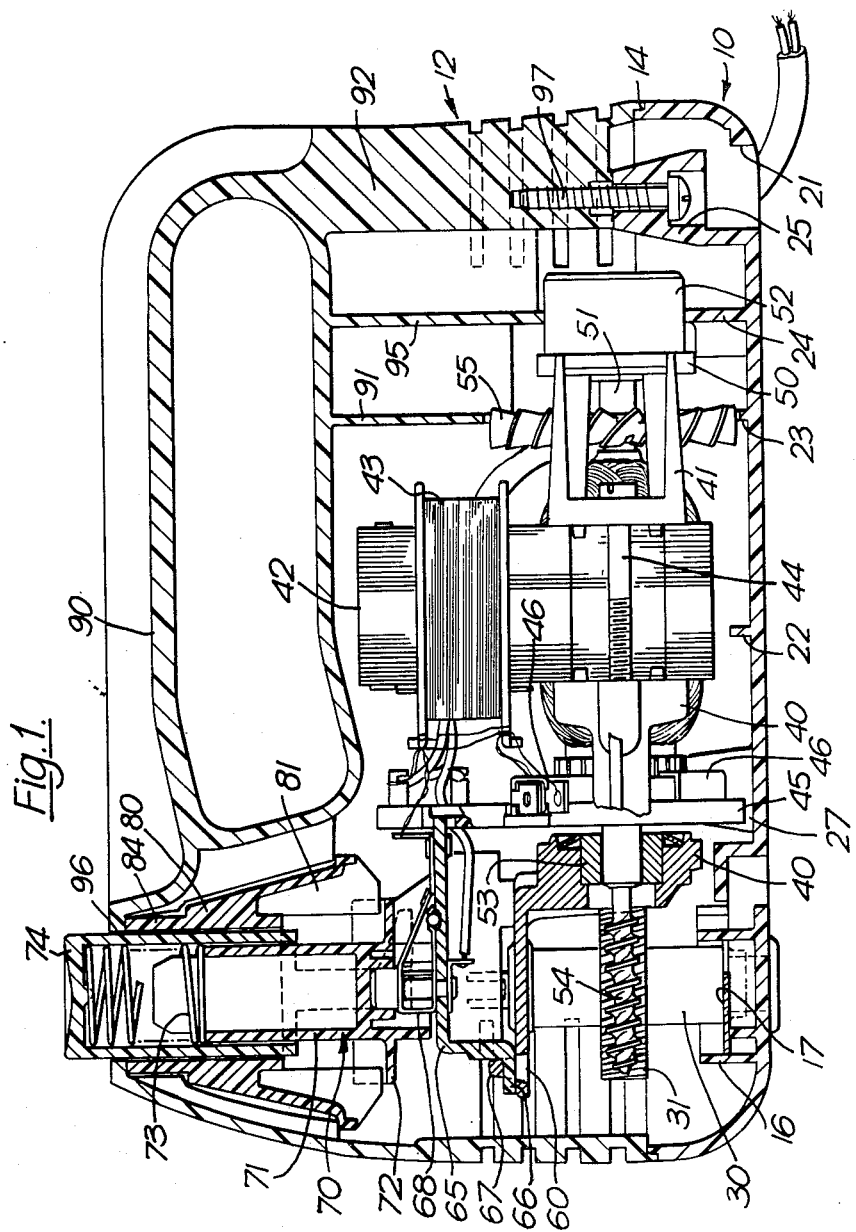
FIG. 1 is a cross-section through one embodiment of mixer according to the invention.

Referring now to the drawings, the mixer illustrated has a housing comprising a base portion 10 and a co-operating cover portion 12, the co-operating edges 14 of the base and cover portions being rebated to lap one another as shown. Both the base portion and cover portion are injection moulded from a plastics material. At its lefthand end, as seen in FIG. 1, the base portion is provided with a pair of upstanding retaining walls 16 which are used to locate a bearing plate 17 formed of sheet metal, this bearing plate having apertures 18 therein aligned with corresponding apertures in the moulding of the base portion of the housing. Recesses 20 and 21 are formed in the housing adjacent each end for reasons to be explained later.

Within the base portion there are provided a central transverse strengthening web 22, a transverse partition web 23 and a transverse support web 24. The base portion is also provided with a rear upstanding locating boss 25 and two forward upstanding locating bosses 26 and 27.

Figure 4:
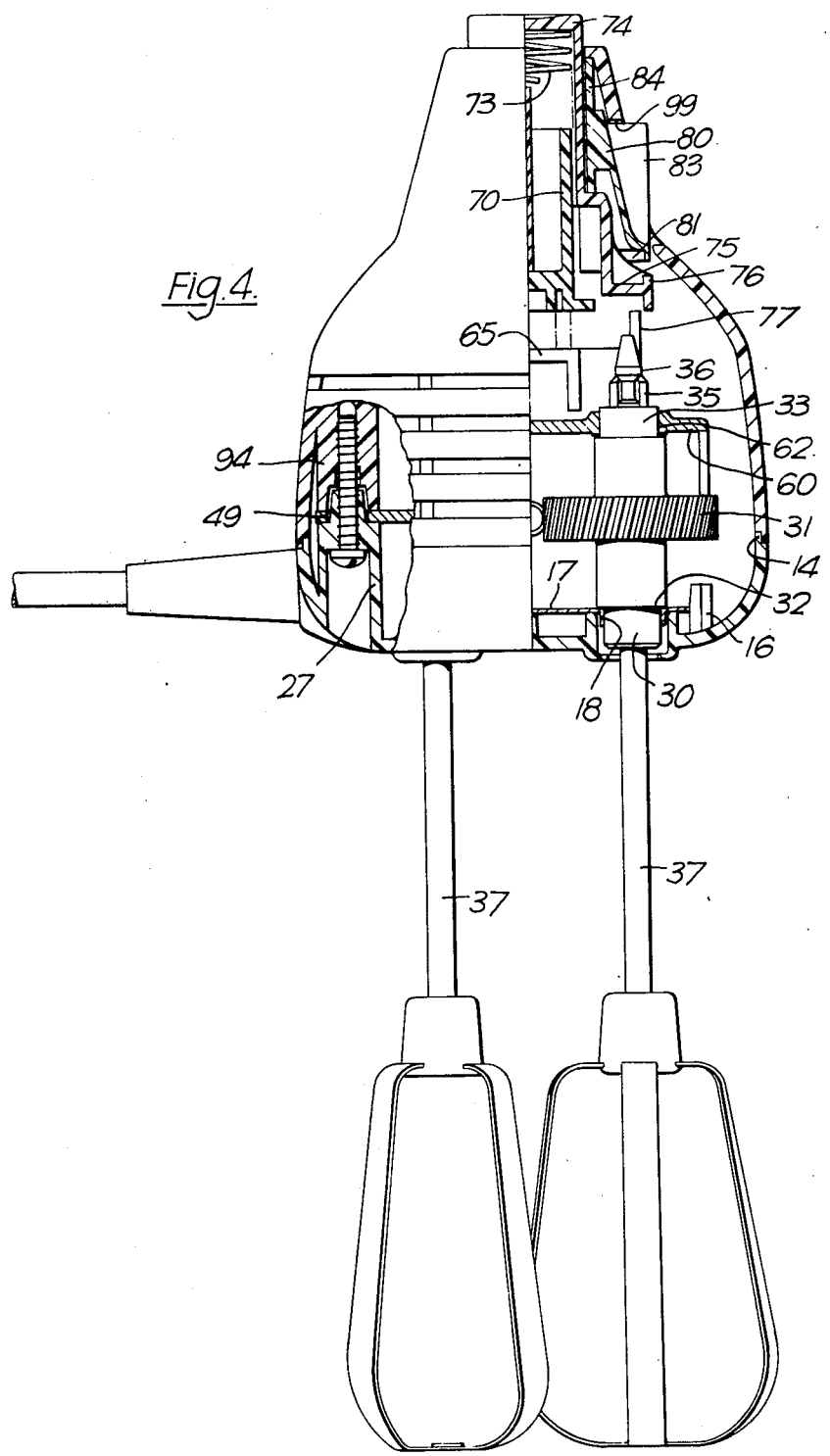
FIG. 4 is an end view of the mixer of FIGS. 1, 2 and 3, in half-section.

Resting in the apertures 18 are the lower axial shafts 30 of two pinions 31. The lower axial shaft is provided with a shoulder 32 which rests on the plate 17 and forms a bearing therefor. The upper side of the pinion is also provided with an upper axial shaft 33 having a shoulder 34. Above the upper ends are provided two retaining fingers 35 for engaging in a groove 36 spaced from the upper end of each of the beater shafts 37 (FIG. 4).

An electric motor (FIGS. 1 and 2) is positioned on the base portion of the housing and this consists of a forward casting 40 and a rearward casting 41, spaced from one another by conventional laminations 42 carrying field coils 43. The two parts of the frame are held together by bolts 44. Before the parts are assembled, an injection moulded brush support 45, carrying brush guides 46, is located on pins in the forward frame portion 40. The electric motor frame includes a rear armature shaft bearing for the armature shaft 51, the bearing being mounted in portion 50 which has, at its rearward end, a surrounding rubber cap 52, while at the forward end the frame portion 40 has the forward armature shaft bearing 53 forward of which the armature is provided with a worm 54. At the location of the partition web 23 the armature carries an axial-flow fan 55.

The forward frame part 40 is cranked upwardly to provide a mounting plate 60 having apertures 62 therein which fit over the upper axial shafts 33 and engage the shoulders 34 thereof to provide, with the bearing plate 17 the full bearing for the two pinions.

To assemble the so-far described parts, the pinions are first placed on the bearing plates 17 so that they engage in the apertures 18 and then the motor assembly, which has been preformed, is positioned so that the apertures 49 in the forward frame portion 40 engage over the bosses 26 and 27, so that the cap 52 rests on the bearing web 24, and so that the apertures 62 engage on the pinions. An injection moulded control switch block 65 provided with a forwardly extending tongue 66 is then positioned on the mounting plate 60, so that the tongue 66 engages under a retaining bar 67 thereof and so that two rearwardly extending tongues 66A engage in slots 67A of the brush support 45. The length of the tongue 66 and the tongue 66A are such that, having been put in place, it is substantially impossible to remove the block 65 after support 45 has been riveted to plate 60. This block has rotatable thereon a contact element 68 and relatively spaced from one another, three contacts 69, for giving three motor speeds.

Resting on the contact 68 is an injection moulded actuator 70 the rotation of which can cause rotation of the contact element 68. The actuator 70 includes an upstanding tubular portion 71 and two radial wings 72 of open topped channel form. Resting on top of the tubular portion 71 of the actuator is a coil compression spring 73 and resting on this is an ejector member 74 provided with two ejector fingers 75 arranged in axial alignment with the upper ends of the beater shaft 37. These fingers 75 which co-operate with ears 77 formed on the block 65, to prevent the ejector from being rotated from a position in which the fingers are axially aligned with the ends of the beater shaft.

Resting on the wings 72 of the actuator 70 is a rotatable control element 80 which is tapered upwardly and provided with two elements 81 which engage in the channel section wings 72 of the actuator so that rotation of a control fin 83 of the control element causes rotation of the actuator and thus of the contact element. The tubular portion 84 of the control element acts as a guide for the ejector 74.

Figure 2:
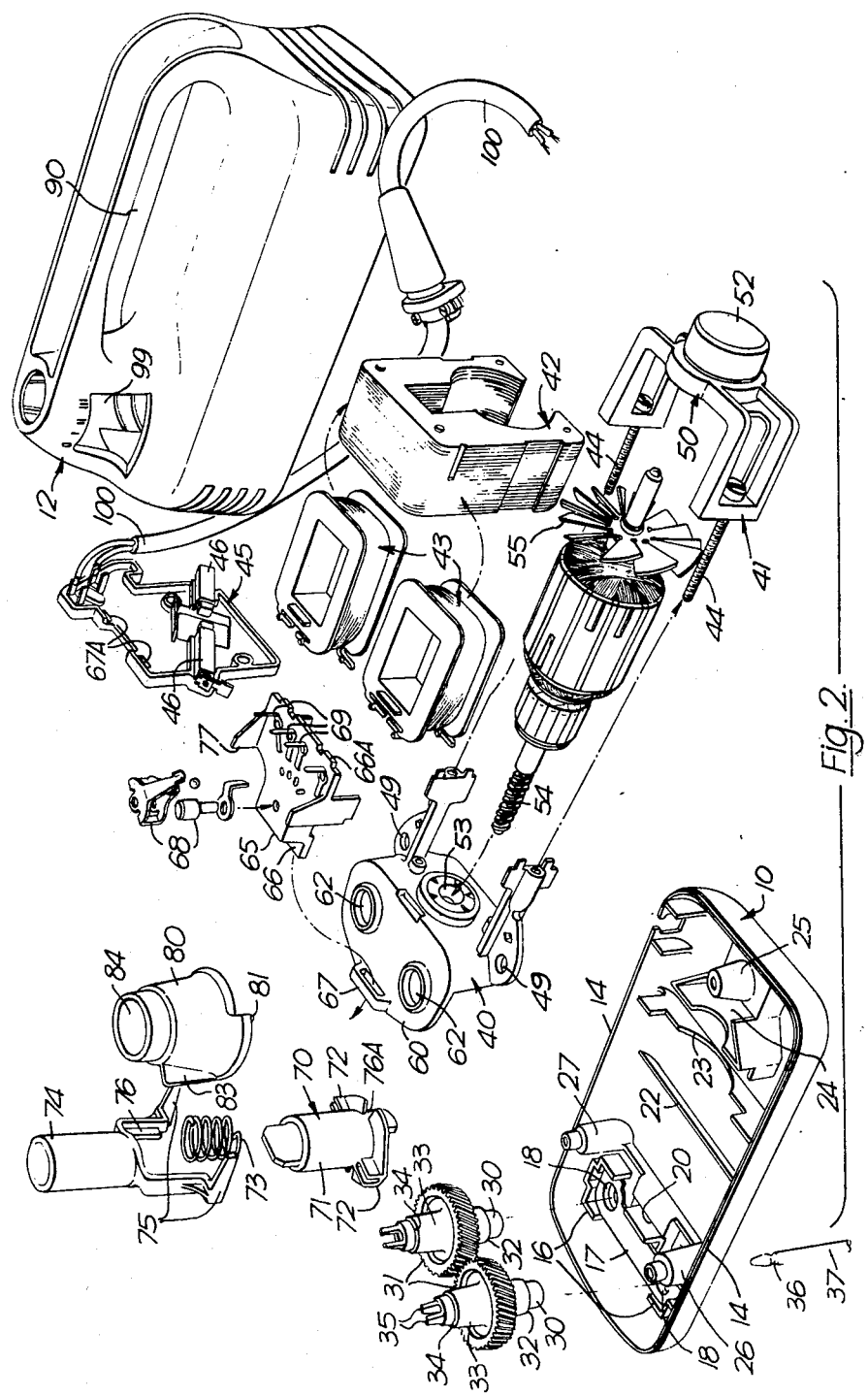
FIG. 2 is an exploded perspective view of the mixer of FIG. 1 showing how the components are assembled.

The cover portion 12 (FIGS. 1 and 4) is provided with a hand-aperture 90 and with several elements which co-operate with the already assembled parts of the mixer. Thus upper transverse partition web 91 co-operates with the partition web 23 to form a partition across the housing at the location of the fan, a rear downwardly extending boss 92 is aligned with the boss 25 and two forward downwardly extending bosses 93 and 94 co-operate with the bosses 26 and 27 of the base portion, and in use, rest upon the part of the forward frame 40 surrounding holes 49 (FIG. 2). A transverse bearing web 95 (FIG. 1) rests upon the cap 52 to hold the rear end of the motor in place. Thus this web and the bosses 93 and 94 secure the motor in position. Finally the lower surface of the wall portion surrounding an orifice 96, through which the ejector 74 passes, rests on the tubular portion 84 of the control element 80 to hold the control element, the ejector and the actuator in position. Fins 96a, the inner surfaces of which are tapered, engage on the tapered surface of the control element and facilitate guiding of the cover portion 12 during assembly.

It will be appreciated that the assembly of the thus described motor is very simple. Having positioned the two pinions in place as indicated, and placed the motor so that the pinions are locked in place by the mounting plate thereof, and so that the worm 54 engages the two pinions 31, the actuator, ejector and control element are then placed in position and the cover portion is fitted over the whole assembly. The mixer is now complete except for screwing the two parts of the housing together by means of self-tapping screws 97 which are passed up through the bosses 25, 26, 27 to engage in the bosses 92, 93 and 94.

When it is desired to eject the beaters, the ejector is depressed. This can only be done when the control switch is at the "off" position, in which position elements 76 on the ejector can pass through slots 76A in the wings of the actuator.

It will be understood that the motor is previously provided with a lead 100 which is soldered at an appropriate place onto the brush holder and that the field windings are connected to the appropriate contacts 69 again by soldering. The fin 83 passes through an opening 99 to enable control of the switch arrangement.

Figure 3:
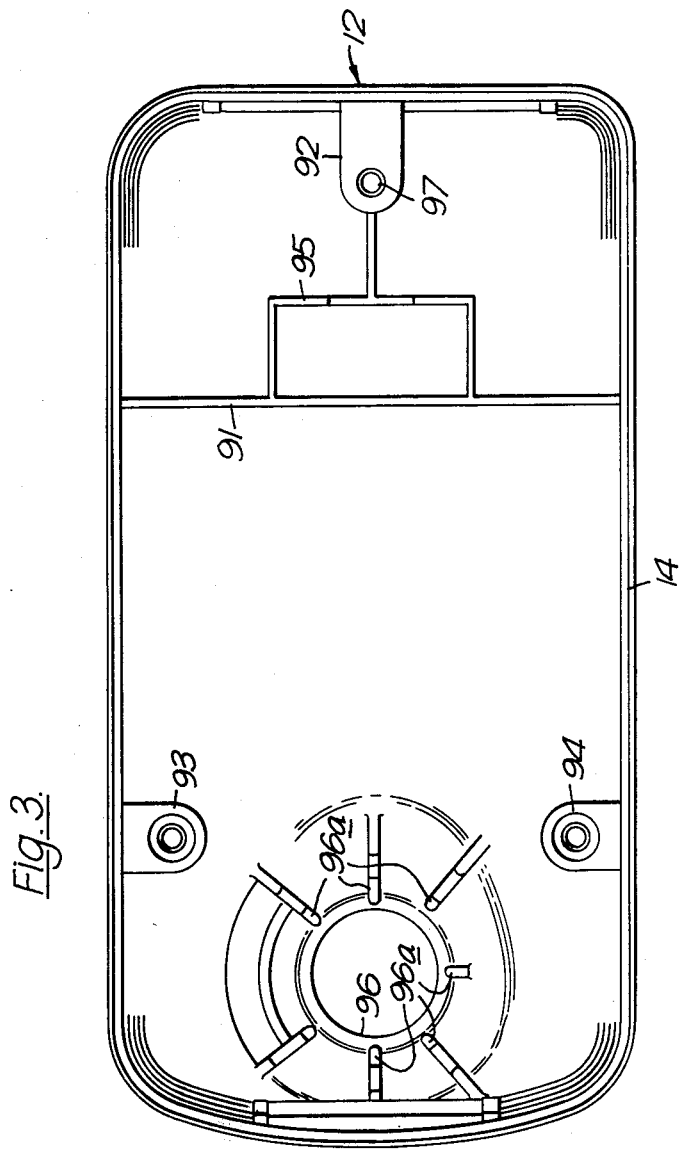
FIG. 3 is an underneath plan of the cover portion of the mixer of FIGS. 1 and 2.
Figure 5:
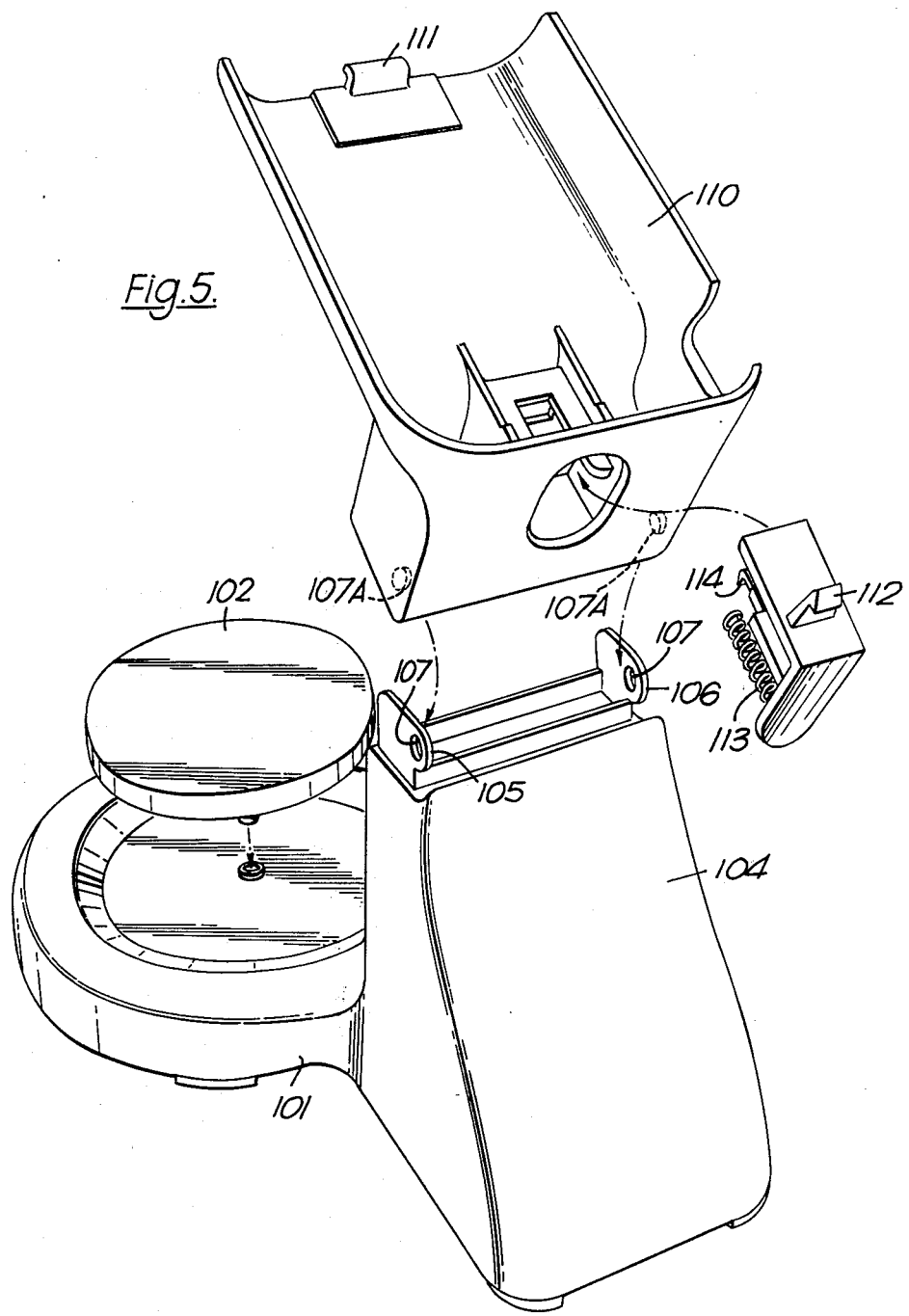
FIG. 5 is a similar view to FIG. 2 of a stand of the mixer of FIGS. 1 and 2.

In FIG. 5 there is illustrated a stand for use with the mixer of FIGS. 1, 2 and 3. This stand includes a base 101 of generally P shape as viewed in plan having centrally of the circular portion thereof, a freely rotatable turntable 102. A separately moulded bowl (not shown) can rest on this turntable and rotate therewith.

The stem portion of the P has an upstanding part 104 and at the top this moulding has two vertically extending resilient fins 105, 106 having apertures 107 therein. The apertures are located approximately centrally of the stem of the P.

A cradle 110 has an upper surface to accept the lower portion of the housing of the mixer, and on this upper surface is formed a fixed catch 111 while at the rear end is a movable catch 112 which itself is formed of a one piece moulding, integral spring 113 and an integral retainer 114 for holding it in place on the cradle. An upstanding catch member thereon is adapted to engage in the recess 21 of the base portion while the other catch engages in the recess 20.

Inwardly projecting pins 107A, having a ramped end surface, are arranged so that when the cradle is pushed downwardly these pins engage in the apertures 107 in the fins. Thus the cradle, the catch and the base can simply be assembled by pushing the catch into the cradle and the cradle onto the base. Again this requires a minimum of assembly time.

It will therefore be appreciated that both the stand and the mixer itself according to the invention can be manufactured at a substantially reduced assembly cost as compared with traditionally manufactured mixers of this general type.

We claim:

1. A domestic food mixer comprising, in combination:
   (a) a plastics material housing including a base portion and a cover portion;
   (b) locating elements on said base portion;
   (c) means defining a pair of apertures adjacent one end of the base portion;
   (d) a bearing plate secured in the base portion of the housing in overlying relation to said apertures;
   (e) a pair of pinions each having a lower axial shaft extending on the lower side of the pinion and an upper axial shaft extending on the upper side of the pinion, the lower axial shaft being located in one of the apertures and having a shoulder resting on said bearing plate, said upper axial shaft having a shoulder thereon;
   (g) an electric motor;
   (h) a frame of said electric motor resting on said locating elements on said base portion;
   (i) an armature shaft on said electric motor;
   (j) a drive worm on said armature shaft engaged between said pinions;
   (k) a mounting plate forming part of said electric motor frame, said mounting plate having means defining two apertures therein, one engaging each upper axial shaft, the mounting plate engaging on the shoulders of the upper axial shaft;
   (l) abutments means on the cover portion of the housing engaging said electric motor; and
   (m) securing means holding the cover and base portions together, whereby said pinions and electric motor are held in place.

2. A domestic food mixer as claimed in claim 1, and further comprising a control switch block fitted onto said mounting plate.

3. A domestic food mixer as claimed in claim 2, and further comprising a brush-holder mounted on said electric motor frame and said control-switch block to retain said control switch block.

4. A domestic food mixer as claimed in claim 2, and further comprising a rotatable contact element mounted on said control-switch block, an actuator resting on said contact element, a switch control element resting on said actuator, means defining an opening in the cover portion of the housing, a portion of said actuator being accessible through said opening, rotation of the control element rotating the actuator and the rotatable contact element, and a part of the cover portion of the housing resting on the switch control element effective to hold the switch control element and actuator in place.

5. A domestic food mixer as claimed in claim 4, wherein the inner surface of said part of the cover portion and the outer surface of the switch control element are tapered so as to converge upwardly.

6. A domestic food mixer as claimed in claim 4, wherein said opening is in the side of said part of the cover, and further comprising means defining an upper orifice formed in said part of the cover portion and an axial bore within said control element aligned with said orifice, an ejector passing through said bore and orifice, a spring urging said ejector upwardly, and ejector fingers carried by said ejector in axial alignment with the upper axial shaft of each pinion.

7. A domestic food mixer as claimed in claim 6, wherein said switch control elements also rest normally on said ejector fingers.

8. A domestic food mixer as claimed in claim 6, and further comprising ears on said control switch box effective to guide said ejector fingers during axial movement of said ejector.

* * * * *